(12) United States Patent
    Sutardja

(10) Patent No.: US 9,397,552 B2
(45) Date of Patent: Jul. 19, 2016

(54) SNUBBER CIRCUIT TO INCREASE EFFICIENCY OF POWER CONVERTERS

(71) Applicant: Marvell World Trade Ltd., St. Michael (BB)

(72) Inventor: Sehat Sutardja, Los Altos Hills, CA (US)

(73) Assignee: Marvell World Trade LTD., St. Michael (BB)

( * ) Notice: Subject to any disclaimer, the term of this patent is extended or adjusted under 35 U.S.C. 154(b) by 93 days.

(21) Appl. No.: 14/271,698

(22) Filed: May 7, 2014

(65) Prior Publication Data
   US 2014/0334201 A1    Nov. 13, 2014

Related U.S. Application Data

(60) Provisional application No. 61/822,084, filed on May 10, 2013.

(51) Int. Cl.
    *H02M 1/34*    (2007.01)
(52) U.S. Cl.
    CPC .......... *H02M 1/34* (2013.01); *H02M 2001/344* (2013.01); *H02M 2001/346* (2013.01); *H02M 2001/348* (2013.01); *Y02B 70/1491* (2013.01)
(58) Field of Classification Search
    CPC ... H02M 1/32; H02M 1/34; H02M 2001/346; H02M 2001/348; H02H 7/125; H02H 7/1213
    USPC .......... 363/50, 52, 53, 125, 126; 361/18, 91.7
    See application file for complete search history.

(56) References Cited

U.S. PATENT DOCUMENTS

| 5,909,107 A * | 6/1999 | Aonuma | H02M 1/34 363/39 |
| 6,169,671 B1 * | 1/2001 | Mao | H02M 1/34 363/53 |
| 7,385,833 B2 * | 6/2008 | Keung | H02M 3/158 363/56.12 |

OTHER PUBLICATIONS

Application Note AN-4147, "Design Guidelines for RCD Snubber of Flyback Converters", Farichild Semiconductor Corporation, 2006Application Note AN-44, "LinkSwitch-II Family Design Guide", Power Integrations, Inc., Jan. 2009.*
International Search Report and Written Opinion mailed Aug. 20, 2014 for International Application No. PCT/US2014/037328; 11 Pages.

* cited by examiner

*Primary Examiner* — Gary L Laxton
*Assistant Examiner* — Jye-June Lee

(57) ABSTRACT

A system including a converter and a snubber circuit. The converter converts an alternating current voltage into a direct current voltage and outputs the direct current voltage across an inductance and a switch connected in series. The inductance has a center tap connected to a node, which is connected to a load. In response to the switch being turned on, a first current flows through the inductance and the switch. In response to the switch being turned off, a second current flows from the node to the load. The snubber circuit is connected across the node and a junction of the inductance and the switch. In response to the switch being turned off, the snubber circuit receives a third current from the junction, and supplies a first portion of the third current to the node. The second current and the first portion of the third current flow through the load.

6 Claims, 5 Drawing Sheets

SNUBBER CIRCUIT TO INCREASE EFFICIENCY OF POWER CONVERTERS

CROSS-REFERENCE TO RELATED APPLICATIONS

This application claims the benefit of U.S. Provisional Application No. 61/822,084, filed on May 10, 2013. The entire disclosure of the application referenced above is incorporated herein by reference.

FIELD

The present disclosure relates generally to power converters and more particularly to a snubber circuit to increase efficiency of power converters.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Alternating current (AC) to direct current (DC) converters convert an AC input voltage to a DC output voltage. The DC output voltage is used to drive a load. AC to DC converters can be of different types. For example, an AC to DC converter may be a Buck type converter, a Boost type converter, a Buck-Boost type converter, and so on. Efficiency is an important design parameter of AC to DC converters.

SUMMARY

A system comprises a converter and a snubber circuit. The converter is configured to convert an alternating current voltage into a direct current voltage, and output the direct current voltage across an inductance and a switch connected in series. The inductance has a center tap connected to a node. The node is connected to a load. In response to the switch being turned on, a first current flows through the inductance and the switch. In response to the switch being turned off, a second current flows from the node to the load. The snubber circuit is connected across the node and a junction of the inductance and the switch. The snubber circuit is configured to, in response to the switch being turned off, receive a third current from the junction, and supply a first portion of the third current to the node. A sum of the second current and the first portion of the third current flows through the load.

In other features, the snubber circuit includes a capacitance connected in parallel to a resistance. A second portion of the third current charges the capacitance in response to the switch being turned off. The capacitance discharges through the resistance in response to the switch being subsequently turned on.

In another feature, the inductance stores energy in response to the switch being turned on, and supplies the second current to the node in response to the switch being subsequently turned off.

In other features, the inductance has (i) a first terminal connected to the converter and a second terminal connected to the switch, and (ii) a first number of turns between the first terminal and the center tap and a second number of turns between the center tap and the second terminal. A ratio of the second current to the third current is proportional to a ratio of the first number of turns to the second number of turns.

In still other features, a method comprises converting an alternating current voltage into a direct current voltage and outputting the direct current voltage across an inductance and a switch connected in series. The inductance has a center tap connected to a node. The node is connected to a load. The method further comprises supplying, in response to the switch being turned on, a first current through the inductance and the switch; and supplying, in response to the switch being turned off, a second current from the node to the load. The method further comprises receiving, in response to the switch being turned off, a third current from a junction of the inductance and the switch; and supplying a first portion of the third current to the node. A sum of the second current and the first portion of the third current flows through the load.

In other features, the method further comprises charging, in response to the switch being turned off, a capacitance with a second portion of the third current; and discharging, in response to the switch being subsequently turned on, the capacitance through a resistance connected in parallel to the capacitance.

In other features, the method further comprises storing, in response to the switch being turned on, energy in the inductance; and supplying, in response to the switch being subsequently turned off, the second current to the node.

In still other features, a system comprises a rectifier circuit, an inductance, a switch, and a snubber circuit. The rectifier circuit is configured to rectify an alternating current voltage into a direct current voltage and to output the direct current voltage across a first terminal and a second terminal to drive a load connected across the first terminal and a node. The inductance has a first terminal connected to the first terminal of the rectifier circuit, a second terminal, and a center tap. The switch has a first terminal connected to the second terminal of the inductance and a second terminal connected to the second terminal of the rectifier circuit. The snubber circuit has a first terminal connected to the first terminal of the switch and a second terminal connected to the node. In response to the switch being turned on, a first current flows from the first terminal of the rectifier circuit to the second terminal of the rectifier circuit through the inductance and the switch. In response to the switch being turned off, a second current flows from the center tap of the inductance to the node, and a first portion of a third current flowing from the second terminal of the inductance to the first terminal of the snubber circuit flows from the second terminal of the snubber circuit to the node. The second current and the first portion of the third current flows through the load.

In other features, the snubber circuit comprises a first diode, a first resistance, a second resistance, and a first capacitance. The first diode has an anode connected to the second terminal of the inductance, and a cathode. The first resistance has a first terminal connected to the cathode, and a second terminal. The second resistance has a first terminal connected to the second terminal of the first resistance and a second terminal connected to the node. The first capacitance has a first terminal connected to the second terminal of the first resistance and a second terminal connected to the second terminal of the second resistance. In response to the switch being turned off, a second portion of the third current flowing from the second terminal of the inductance to the first terminal of the snubber circuit charges the first capacitance. In response to the switch being turned on, the first capacitance discharges through the second resistance.

In another feature, the system further comprises a diode having an anode connected to the center tap and a cathode connected to the node.

In other features, the inductance has (i) a first number of turns between the first terminal and the center tap and (ii) a second number of turns between the center tap and the second terminal. A ratio of the second current to the third current is proportional to a ratio of the first number of turns to the second number of turns.

In still other features, a system comprises a converter and a snubber circuit. The converter is configured to convert an alternating current voltage to a direct current voltage and to supply a first current to a load. The snubber circuit is configured to receive a second current from the converter and to supply a first portion of the second current to the load.

In other features, the converter comprises a rectifier and an inductance connected in series to a switch. The rectifier is configured to receive the alternating current voltage and to output the direct current voltage. The direct current voltage is applied across the series combination of the inductance and the switch.

In another feature, the inductance has a center tap connected to a node, and the load is connected to the node.

In other features, the snubber circuit is connected between the node and a junction of the inductance and the switch, and the snubber circuit comprises (i) a capacitance and (ii) a resistance connected in parallel to the capacitance.

In other features, in response to the switch being turned on, the inductance is configured to store energy based on a third current flowing through the inductance and the switch. In response to the switch being turned off, the inductance supplies the first current to the load based on the stored energy, the second current flows from the junction to the snubber circuit, the first portion of the second current flows from the snubber circuit to the node and adds to the first current flowing through the load, and a second portion of the second current charges the capacitance.

In another feature, in response to the switch being turned on again, the capacitance discharges through the resistance.

In other features, the inductance has (i) a first terminal connected to the rectifier and a second terminal connected to the switch, and (ii) a first number of turns between the first terminal and the center tap and a second number of turns between the center tap and the second terminal. A ratio of the first current to the second current is proportional to a ratio of the first number of turns to the second number of turns.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1A:
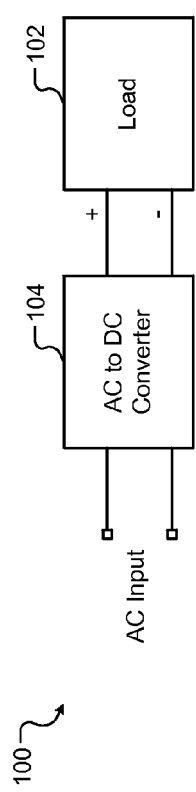
FIG. 1A is a functional block diagram of an AC to DC converter that drives a load.
Figure 1B:
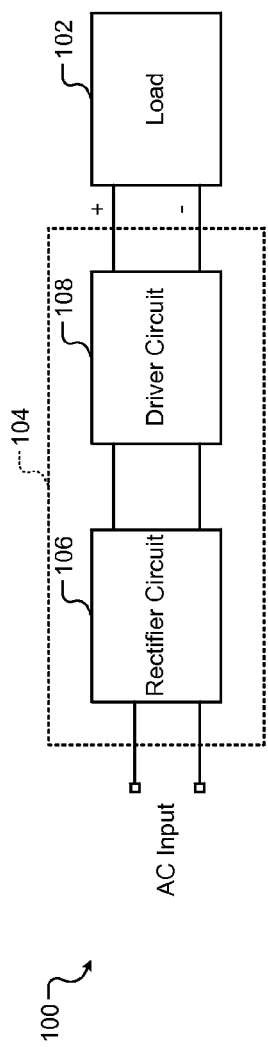
FIG. 1B depicts an example of the AC to DC converter shown in FIG. 1A.
Figure 1C:
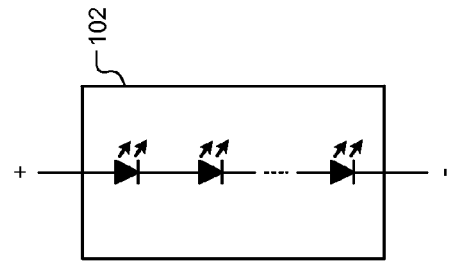
FIG. 1C depicts an example of the load shown in FIG. 1A.

FIGS. 1A-1C show an example of a system 100 comprising a load 102 driven by an AC input. In FIG. 1A, for example, the system 100 includes an AC to DC converter 104 that converts an AC voltage into a DC voltage. For example, the AC to DC converter 104 may include a Buck-Boost type converter. The DC voltage is applied across the load 102 as shown.

In FIG. 1B, for example, the AC to DC converter 104 includes a rectifier circuit 106 and a driver circuit 108. The rectifier circuit 106 rectifies the AC voltage into the DC voltage. The driver circuit 108 receives the DC voltage from the rectifier circuit 106 and drives the load 102.

In FIG. 1C, an example of the load 102 is shown. For example, the load 102 may include a plurality of light emitting diodes (LEDs) connected in series as shown. Alternatively, the load 102 may include any circuit or a device that can be powered by DC voltage.

Figure 2:
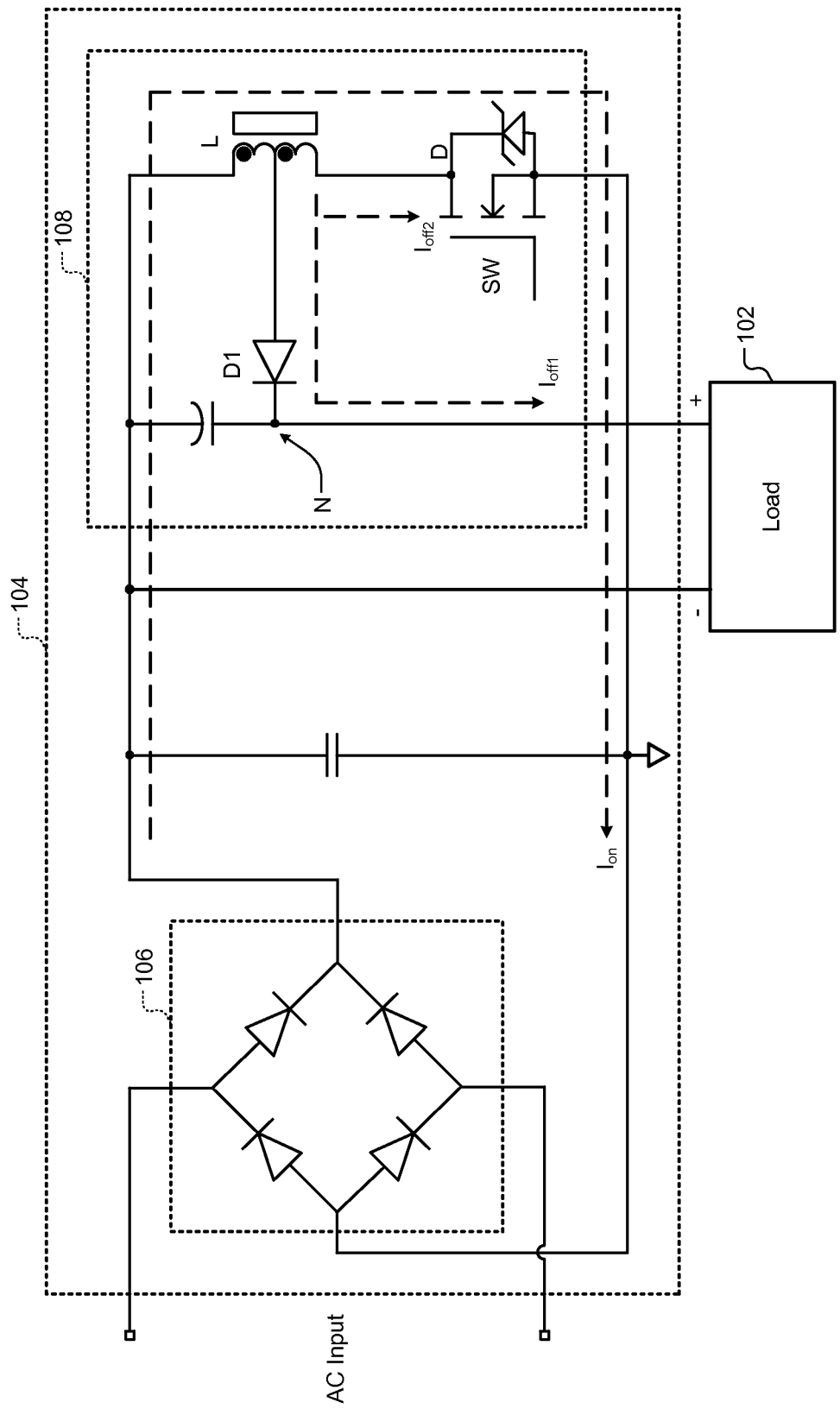
FIG. 2 is a schematic of an AC to DC converter that does not use a snubber circuit.

FIG. 2 shows an example of the AC to DC converter 104. For example, the rectifier circuit 106 includes a bridge rectifier. The rectifier circuit 106 rectifies the AC voltage into the DC voltage and outputs the DC voltage across first and second terminals.

The driver circuit 108 includes an inductance L connected in series with a switch SW. For example, the switch SW may include a metal-oxide semiconductor field-effect transistor (MOSFET). The series combination of the inductance L and the switch SW is connected across the first and second terminals of the rectifier circuit 106 as shown.

The inductance L has a center tap. The center tap of the inductance L is connected to a node N via a diode D1 as shown. The first terminal of the rectifier circuit 106 is connected to a first terminal of the load 102. The node N is connected to a second terminal of the load 102. The driver circuit 108 may use pulse width modulation (PWM) to turn the switch SW on and off at a duty cycle.

When the switch SW is turned on, current flows from the first terminal of the rectifier circuit 106 to the second terminal of the rectifier circuit 106 via the inductance L and the switch SW, and energy is stored in the inductance L. When the switch is turned off, the energy stored in the inductance L causes a current $l_{off1}$ to flow through the load 102. The current $l_{off1}$ drives the load 102. A leakage current $l_{off2}$ flows through the switch SW. The leakage current $l_{off2}$ may cause a high-voltage spike at the drain terminal of the switch SW. The high-voltage spike may cause a reverse breakdown of the switch SW.

Figure 3:
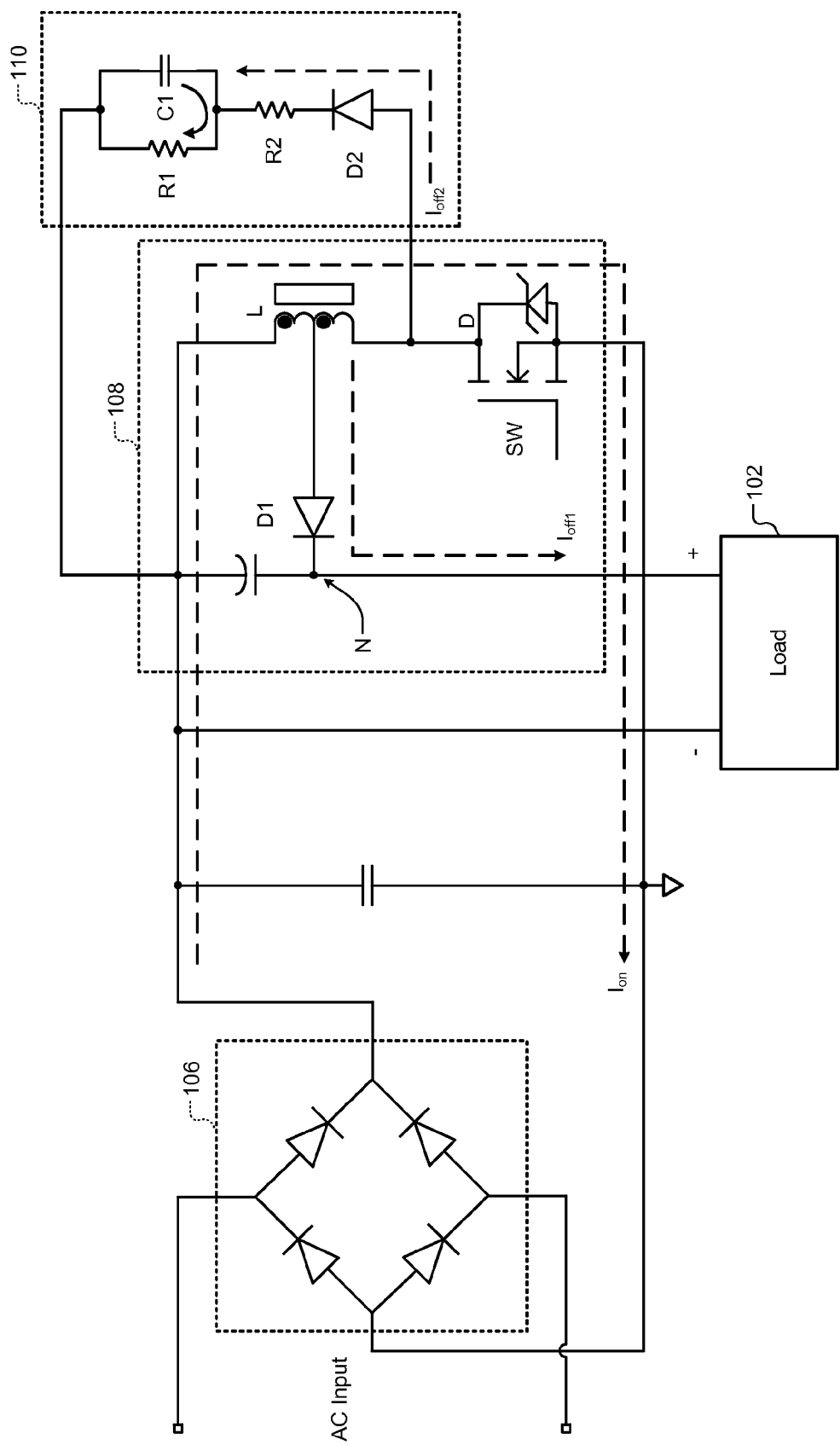
FIG. 3 is a schematic of an AC to DC converter that uses a snubber circuit.

FIG. 3 shows a snubber circuit 110 to prevent the reverse breakdown of the switch SW. The snubber circuit 110 is used in combination with the circuit shown in FIG. 2. The snubber circuit 110 includes a diode D2 connected in series with a resistance R2, and an RC circuit including a resistance R1 connected in parallel to a capacitance C1.

The snubber circuit 110 is connected as shown. One end of the RC circuit is connected to the resistance R2, and the other end of the RC circuit is connected to the first terminal of the rectifier circuit 106. A first terminal of the snubber circuit 110, which is the anode of the diode D2, is connected to the drain terminal D of the switch SW. A second terminal of the snubber circuit 110 is connected to the first terminal of the rectifier circuit 106.

When the switch SW is turned on, current flows from the first terminal of the rectifier circuit 106 to the second terminal of the rectifier circuit 106 via the inductance L and the switch SW, and energy is stored in the inductance L. When the switch is turned off, the energy stored in the inductance L causes the current $l_{off1}$ to flow through the load 102. The leakage current $l_{off2}$ flows through the snubber circuit 110 instead of flowing through the switch SW.

The leakage current $l_{off2}$ charges the capacitance C1. Subsequently, when the switch SW is turned on again, the capacitance C1 discharges through the resistance R1, which results in heating the resistance R1. Accordingly, the leakage current $l_{off2}$ stresses the resistance R1 instead of stressing the switch SW. Nonetheless, dissipating energy in the form of heat reduces the efficiency of the AC to DC converter.

Figure 4:
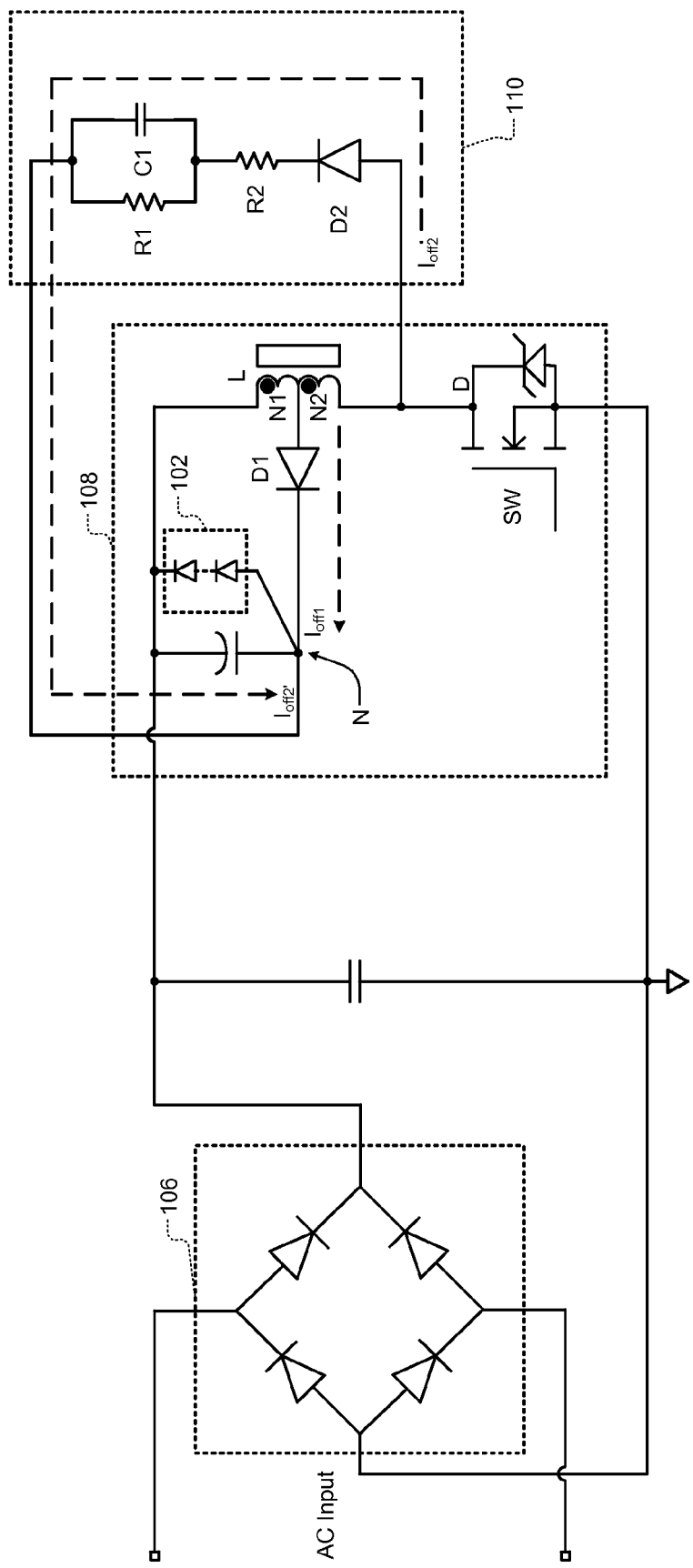
FIG. 4 is a schematic of an AC to DC converter comprising a snubber circuit that increases efficiency of the AC to DC converter by increasing current through the load and decreasing heat dissipation.

FIG. 4 shows an AC to DC converter that includes the snubber circuit 110 connected as shown. For example only, the load 102 is shown as comprising a plurality of light emitting diodes (LEDs) connected in series. The snubber circuit 110, when connected as shown, increases current through the load 102, decreases heat dissipation, and increases the efficiency of the AC to DC converter as follows. The first terminal of the snubber circuit 110, which is the anode of the diode D2, is still connected to the drain terminal D of the switch SW. The second terminal of the snubber circuit 110, however, is not connected to the first terminal of the rectifier circuit 106. Instead, the second terminal of the snubber circuit 110 is connected to the node N, which is connected to the second terminal of the load 102.

Consequently, when the switch SW is turned off, a first portion of the leakage current $l_{off2}$ still charges the capacitance C1. A second portion of the leakage current $l_{off2}$, however, flows through the snubber circuit 110 to the node N. Accordingly, the net current that flows through the load 102 increases by the amount of the second portion of the leakage current $l_{off2}$. The second portion of the leakage current $l_{off2}$ is denoted as $l_{off2'}$ in FIG. 4.

Specifically, the net current that flows through the load 102 is a sum of the current $l_{off1}$ and the second portion of the leakage current $l_{off2}$ (i.e., $l_{off2'}$). Since only the first portion of the leakage current $l_{off2}$ charges the capacitance C1, when the capacitance C1 discharges through the resistance R1, the amount of heat generated in the resistance R1 is proportional only to the first portion of the leakage current $l_{off2}$. Accordingly, the amount of heat generated in the resistance R1 is not proportional to the entire leakage current $l_{off2}$.

More specifically, when the switch SW is turned on, current flows from the first terminal of the rectifier circuit 106 to the second terminal of the rectifier circuit 106 via the inductance L and the switch SW, and energy is stored in the inductance L. When the switch is turned off, the energy stored in the inductance L causes the current $l_{off1}$ to flow through the load 102. The leakage current $l_{off2}$ flows through the snubber circuit 110 instead of flowing through the switch SW. However, only the first portion of the leakage current $l_{off2}$ charges the capacitance C1. The second portion of the leakage current $l_{off2}$ (i.e., $l_{off2'}$) flows through the snubber circuit 10 and adds to the current $l_{off1}$ at the node N. As a result, the net current that flows through the load 102 increases by an amount equal to the second portion of the leakage current $l_{off2}$, which increases the efficiency of the AC to DC converter.

Subsequently, when the switch SW is turned on again, the capacitance C1 discharges through the resistance R1, which results in heating the resistance R1. The amount of heat generated in the resistance R1, however, is proportional only to the first portion of the leakage current $l_{off2}$ and not to the entire leakage current $l_{off2}$. Accordingly, the stress on the resistance R1 is reduced, and the efficiency of the AC to DC converter is increased.

The inductance L has a first terminal connected to the first terminal of the rectifier circuit 106 and a second terminal connected to the drain terminal of the switch SW. The inductance L has N1 turns between the first terminal and the center tap and N2 turns between the center tap and the second terminal. The ratio of N1 to N2 determines the amount of energy saved (i.e., supplied to and utilized by the load 102 (e.g., in the form of the current $l_{off1}$)) and the amount of energy supplied to and utilized by the snubber circuit 110 (e.g., in the form of the leakage current $l_{off2}$). For example, if N1:N2=1:1, half of the energy is saved, and half of the energy is supplied to the snubber circuit 110; if N1:N2=2:1, $\frac{2}{3}^{rd}$ of the energy is saved, and $\frac{1}{3}^{rd}$ of the energy is supplied to the snubber circuit 110; and so on. In general, if N1:N2=T:1, where T is an integer greater than or equal to 1, a (T/T+1))th portion of the energy is saved, and (1/T)th portion of the energy is supplied to the snubber circuit 110. The ratio of currents $l_{off1}$:$l_{off2}$ is proportional to the ratio N1:N2. The current $l_{off1}$ increases and the leakage current $l_{off2}$ decreases as T increases. The amount of energy saved and the efficiency of the converter is proportional to T.

Figure 5:
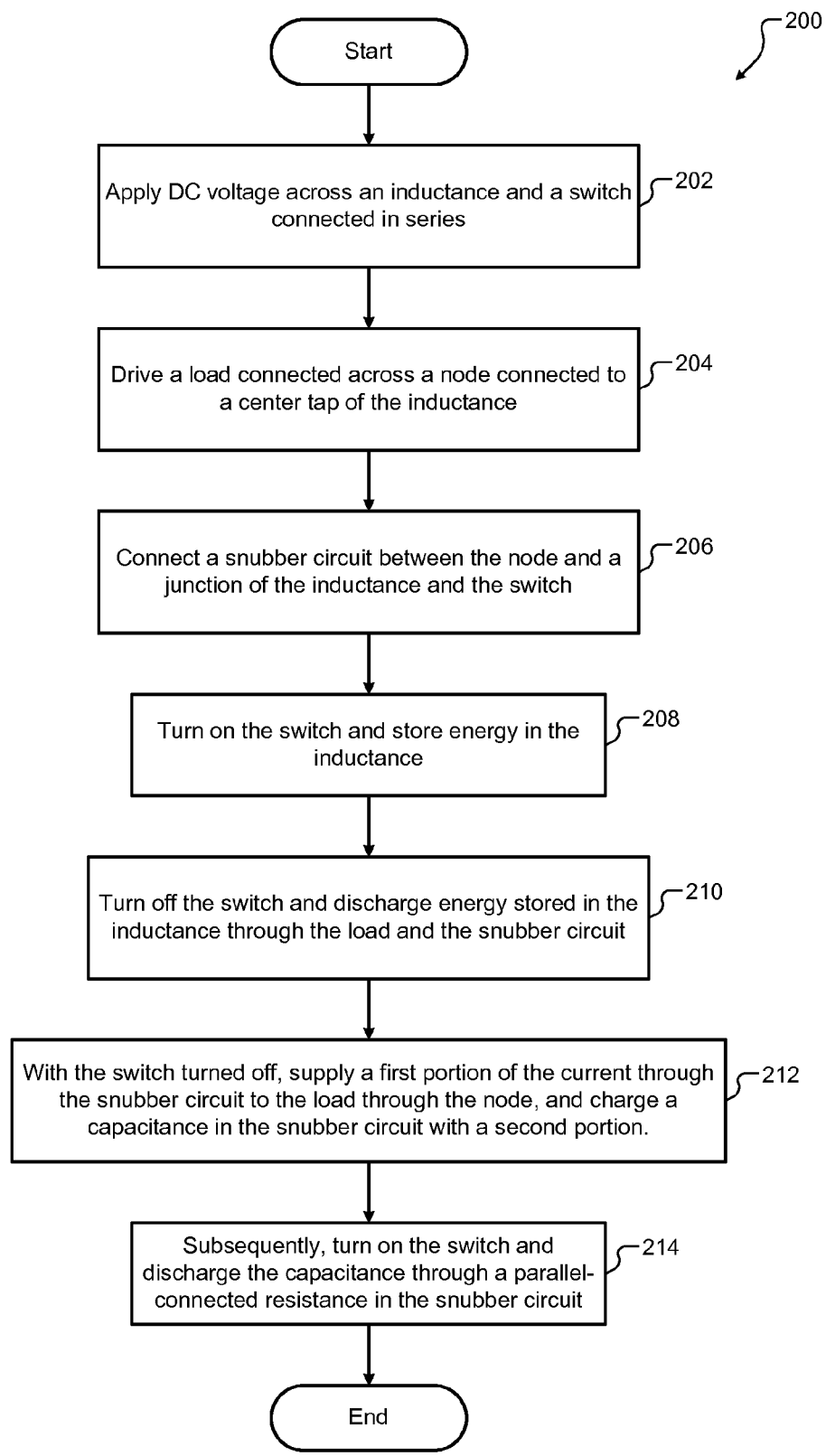
FIG. 5 is a flowchart of a method for driving a load with an AC to DC converter comprising a snubber circuit that increases efficiency of the AC to DC converter by increasing current through the load and decreasing heat dissipation.

FIG. 5 shows a method 200 for driving a load with an AC to DC converter comprising a snubber circuit that increases efficiency of the AC to DC converter by increasing current through the load and decreasing heat dissipation. At 202, a DC voltage is applied across an inductance and a switch connected in series. At 204, the DC voltage is used to drive a load connected across a node, where the node is connected to a center tap of the inductance. At 206, a snubber circuit is connected between the node and a junction of the inductance and the switch.

At 208, the switch is turned on, and energy is stored in the inductance. At 210, the switch is turned off, and the energy stored in the inductance is discharged through the load and the snubber circuit. At 212, with the switch turned off, a first portion of a leakage current through the snubber circuit is supplied to the load through the node, and a second portion of the leakage current through the snubber circuit is used to charge a capacitance in the snubber circuit.

At 214, the switch is turned on again, and the capacitance is discharged through a resistance connected in parallel with the capacitance in the snubber circuit. Accordingly, efficiency is increased by increasing current supplied to load and by decreasing heat dissipated in the resistance connected in parallel with the capacitance in the snubber circuit.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:
1. A system comprising:
   a converter configured to
     convert an alternating current voltage into a direct current voltage, and output the direct current voltage across an inductance and a switch connected in series,
wherein the inductance has a center tap connected to a node via a diode,
wherein the node is connected to a load,
wherein in response to the switch being turned on, a first current flows through the inductance and the switch, and
wherein in response to the switch being turned off, a second current flows from the node to the load; and
a snubber circuit connected across the node and a junction of the inductance and the switch,
wherein the snubber circuit is configured to, in response to the switch being turned off,
receive a third current from the junction, and
supply a first portion of the third current to the node,
wherein a sum of the second current and the first portion of the third current flows through the load,
wherein the snubber circuit includes a capacitance connected in parallel to a resistance,
wherein a second portion of the third current charges the capacitance in response to the switch being turned off, and
wherein the capacitance discharges through the resistance in response to the switch being subsequently turned on.

2. The system of claim 1, wherein the inductance stores energy in response to the switch being turned on, and supplies the second current to the node in response to the switch being subsequently turned off.

3. The system of claim 1, wherein:
the inductance has (i) a first terminal connected to the converter and a second terminal connected to the switch, and (ii) a first number of turns between the first terminal and the center tap and a second number of turns between the center tap and the second terminal; and
a ratio of the second current to the third current is proportional to a ratio of the first number of turns to the second number of turns.

4. A system comprising:
a rectifier circuit configured to rectify an alternating current voltage into a direct current voltage and to output the direct current voltage across a first terminal and a second terminal to drive a load connected across the first terminal and a node;
an inductance having a first terminal connected to the first terminal of the rectifier circuit, a second terminal, and a center tap;
a switch having a first terminal connected to the second terminal of the inductance and a second terminal connected to the second terminal of the rectifier circuit; and
a snubber circuit having a first terminal connected to the first terminal of the switch and a second terminal connected to the node,
wherein in response to the switch being turned on, a first current flows from the first terminal of the rectifier circuit to the second terminal of the rectifier circuit through the inductance and the switch, and
wherein in response to the switch being turned off, a second current flows from the center tap of the inductance to the node, and a first portion of a third current flowing from the second terminal of the inductance to the first terminal of the snubber circuit flows from the second terminal of the snubber circuit to the node, and
wherein the second current and the first portion of the third current flows through the load,
wherein the snubber circuit comprises:
a first diode having an anode connected to the second terminal of the inductance, and a cathode;
a first resistance having a first terminal connected to the cathode, and a second terminal;
a second resistance having a first terminal connected to the second terminal of the first resistance and a second terminal connected to the node; and
a first capacitance having a first terminal connected to the second terminal of the first resistance and a second terminal connected to the second terminal of the second resistance,
wherein in response to the switch being turned off, a second portion of the third current flowing from the second terminal of the inductance to the first terminal of the snubber circuit charges the first capacitance, and
wherein in response to the switch being turned on, the first capacitance discharges through the second resistance.

5. The system of claim 4, further comprising a diode having an anode connected to the center tap and a cathode connected to the node.

6. The system of claim 4, wherein:
the inductance has (i) a first number of turns between the first terminal and the center tap and (ii) a second number of turns between the center tap and the second terminal; and
a ratio of the second current to the third current is proportional to a ratio of the first number of turns to the second number of turns.

* * * * *